US008800704B2

(12) United States Patent
Kitaoka et al.

(10) Patent No.: US 8,800,704 B2
(45) Date of Patent: Aug. 12, 2014

(54) WHEEL LOADER

(71) Applicant: Komatsu Ltd., Tokyo (JP)

(72) Inventors: Hiroyuki Kitaoka, Komatsu (JP); Ryuutaro Kato, Kanazawa (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 13/822,451

(22) PCT Filed: Sep. 18, 2012

(86) PCT No.: PCT/JP2012/073779
§ 371 (c)(1),
(2), (4) Date: Mar. 12, 2013

(87) PCT Pub. No.: WO2014/002299
PCT Pub. Date: Jan. 3, 2014

(65) Prior Publication Data
US 2014/0056675 A1   Feb. 27, 2014

(30) Foreign Application Priority Data

Jun. 28, 2012   (JP) ................................. 2012-145471

(51) Int. Cl.
*B60K 11/06* (2006.01)
*E02F 9/08* (2006.01)
*E02F 9/18* (2006.01)
*B60K 11/04* (2006.01)
*B62D 49/08* (2006.01)

(52) U.S. Cl.
CPC ................. *E02F 9/0866* (2013.01); *E02F 9/18* (2013.01); *B60K 11/04* (2013.01); *B62D 49/085* (2013.01)
USPC ..... 180/89.1; 180/311; 180/312; 296/100.06; 296/193.01; 414/680; 414/685; 414/719

(58) Field of Classification Search
USPC ........ 414/680, 685, 719; 296/100.06, 193.01; 180/89.1, 311, 312
See application file for complete search history.

(56) References Cited

U.S. PATENT DOCUMENTS

2007/0056786 A1* 3/2007 Fukazawa et al. ......... 180/89.12
2009/0252586 A1* 10/2009 Sumiyoshi et al. ........... 414/685

FOREIGN PATENT DOCUMENTS

CN   101138963 A   3/2008
JP   2002-266376 A   9/2002
(Continued)

OTHER PUBLICATIONS

International Search Report for PCT/JP2012/073779.
(Continued)

*Primary Examiner* — Scott Lowe
(74) *Attorney, Agent, or Firm* — Global IP Counselors, LLP

(57) ABSTRACT

A wheel loader includes a vehicle body frame, an engine, a working unit a fuel tank and a cooling device. The fuel tank is attached to a bottom surface of a rear part of the vehicle body frame, and has a rear end surface slanted obliquely rearwards from up to down. The cooling device is configured to release heat of a coolant flowing through an inside thereof. The cooling device is supported by the rear part of the vehicle body frame. A bottom end portion of the cooling device is opposed to and separated away from a rear end surface of the fuel tank at a predetermined distance in a back-and-forth direction. A bottom surface of the cooling device is positioned lower than a top surface of a rear end portion of the fuel tank.

10 Claims, 8 Drawing Sheets

(56) References Cited

FOREIGN PATENT DOCUMENTS

| JP | 2004-142597 A | 5/2004 |
| JP | 2004-276881 A | 10/2004 |
| JP | 2006-183399 A | 7/2006 |
| JP | 2009-29183 A | 2/2009 |
| JP | 2009-56828 A | 3/2009 |

OTHER PUBLICATIONS

The Extended European Search Report for the corresponding European application No. 12840830.9, issued on Dec. 10, 2013.
The Chinese Office Action for the corresponding Chinese patent application No. 201280002495.0, issued on Apr. 28, 2014.

* cited by examiner

WHEEL LOADER

CROSS-REFERENCE TO RELATED APPLICATIONS

This application claims priority to Japanese Patent Application No. 2012-145471 filed on Jun. 28, 2012, the disclosure of which is hereby incorporated herein by reference in its entirety.

TECHNICAL FIELD

The present invention relates to a wheel loader, and in more detail, to a wheel loader including a vehicle body frame, a fuel tank and a cooling device such as a radiator.

BACKGROUND ART

An engine compartment is disposed in the rear part of the wheel loader. The engine room accommodates an engine and a cooling device, and further accommodates a fuel tank below the devices. The cooling device is formed by a fan to be rotated by the engine, an intercooler, an oil cooler, a radiator and etc.

For example, Japan Laid-open Patent Application Publication No. JP-A-2002-266376 describes an exemplary conventional structure of such wheel loader rear part. In the rear part structure described in Japan Laid-open Patent Application Publication No. JP-A-2002-266376, a fuel tank is attached to the bottom surface of the rear end part of a vehicle body frame. The rear part of the fuel tank is extended to a position roughly the same as that of the rear end of the vehicle body frame, while being supported by a plate of the rear end of the vehicle body frame. Further, a cooling device, including a radiator and an oil cooler, is disposed above the fuel tank.

SUMMARY

It has been demanded for wheel loaders of recent years to increase the cooling capacity of a cooling device including a radiator. To increase the cooling capacity, the volume of the cooling device is required to be increased. Further, a rectangular fin may be employed as a core of the radiator in order to inhibit clogging in the radiator. When such rectangular fin is employed, a fin pitch is extended and the core of the radiator is enlarged. Because of such various reasons, increase in size of the radiator has been demanded in recent years.

Now, in the structure described in Patent Literature 1, the fuel tank is disposed below the radiator, and therefore, the radiator is required to be upwardly extended for increasing the volume thereof. However, when the radiator is upwardly extended, a rear view from an operator seat is obstructed. Wheel loaders often move backwards during execution of a work. Therefore, a work will be negatively affected when the rear view is obstructed.

In view of the above, it can be considered to increase the capacity of the radiator by forwardly shifting the rear end surface of the fuel tank and by downwardly extending the bottom part of the radiator with use of a space produced anew. However, in such structure, the lower part of the radiator is overlapped with the fuel tank in the up-and-down direction. Therefore, the lower part of the radiator, overlapped with the fuel tank, cannot be easily cooled down where a cooling structure is employed that cooling wind is taken in from the upper part and the right and left lateral parts of the vehicle and is then discharged rearwards.

It is an object of the present invention to provide a wheel loader whereby the capacity of a cooling device including a radiator can be increased without deteriorating a rear view, and in addition, cooling performance is not deteriorated.

A wheel loader according to a first aspect of the present invention includes a vehicle body frame, an engine installed in the vehicle body frame, a working unit, a fuel tank and a cooling device. The working unit includes a boom and a bucket mounted to a front end of the boom, and is disposed forwards of the vehicle body frame. The fuel tank is attached to a bottom surface of a rear part of the vehicle body frame and has a rear end surface slanted obliquely rearwards from up to down. The cooling device, configured to release heat of a coolant flowing through an inside thereof, is supported by the rear part of the vehicle body frame, and is disposed while a bottom end portion thereof is opposed to and separated away from a rear end surface of the fuel tank at a predetermined distance in a back-and-forth direction and while a bottom surface thereof is positioned lower than a top surface of the rear end portion of the fuel tank.

Here, the cooling device is disposed rearwards of the fuel tank and is extended while the bottom surface thereof is positioned lower than the top surface of the fuel tank. Therefore, the capacity of the cooling device can be increased without extending the upper part of the cooling device, i.e., without deteriorating a rear view. Further, the fuel tank and the cooling device are disposed away from each other at a predetermined distance, and a clearance is thus produced between the both devices. Therefore, cooling wind can be introduced through the clearance and can be fed even to a lower part of the cooling device overlapped with the fuel tank. In addition, the rear end surface, opposed to the cooling device, of the fuel tank is slanted obliquely rearwards from up to down. Therefore, cooling wind can be easily introduced to the clearance between the rear end surface of the fuel tank and the cooling device. Further, a pipe can be disposed for making a coolant flow therethrough with use of the clearance and the pipe can be easily handled.

A wheel loader according to a second aspect of the present invention relates to the wheel loader of the first aspect, and further includes a counterweight disposed rearwards of the cooling device. Further, the bottom end portion of the cooling device is positioned lower than a top surface of the counterweight.

Here, the capacity of the cooling device can be increased without deteriorating a rear view.

A wheel loader according to a third aspect of the present invention relates to the wheel loader of the second aspect and wherein the cooling device includes a radiator and a fan. The fan is disposed rearwards of the radiator and is configured to feed a cooling wind from front to rear of the radiator.

Here, through driving of the fan, the atmospheric pressure gets relatively lower in a part, disposed oppositely to the fan, of the radiator. Therefore, external air is inhaled inside through the clearance between the fuel tank and the bottom end portion of the cooling device. Therefore, even the bottom end portion of the cooling device including the radiator can be efficiently cooled down.

A wheel loader according to a fourth aspect of the present invention relates to the wheel loader of the third aspect, and wherein the fan is disposed while a center thereof is upwardly off-set with respect to a center of the cooling device.

Here, the cooling device is disposed while being extended downwards. Therefore, if the center position of the cooling device is set to be identical to that of the fan, the fan is supposed to be disposed in a position lower than a normal attached position of a fan. In this case, it is expected that the flow of the cooling wind is impeded by the vehicle body frame and the counterweight, and thereby, the cooling wind cannot be smoothly discharged to the outside of the vehicle body.

In view of the above, in the wheel loader according to the fourth aspect, the fan is prevented from being disposed in a remarkably lower attached position while being disposed in a position upwardly off-set with respect to the center of the cooling device. Therefore, deterioration in cooling performance is prevented, although the cooling device is disposed while being downwardly extended.

A wheel loader according to a fifth aspect of the present invention relates to the wheel loader according to the third or fourth aspect, and wherein the fan is disposed while a bottom surface thereof is positioned higher than the top surface of the counterweight, and is allowed to be opened and closed about one of lateral parts thereof in a transverse direction.

Here, the fan is allowed to be opened and closed in the transverse direction. In addition, the bottom surface of the fan is positioned higher than the top surface of the counterweight. Therefore, a maintenance work can be easily executed for the fan by transversely opening the fan while the counterweight is attached.

A wheel loader according to a sixth aspect of the present invention relates to the wheel loader of any of the third to fifth aspects, and wherein the cooling device further includes a shroud that is disposed below the fan and directs the cooling wind having passed through the radiator to the fan.

Here, the cooling wind, having passed through the radiator, is directed to the fan along the shroud. Therefore, cooling performance is enhanced.

A wheel loader according to a seventh aspect of the present invention relates to the wheel loader of any of the first to sixth aspects, and further includes a cover covering a clearance between the fuel tank and the cooling device from below.

Here, the bottom end portion of the cooling device is disposed rearwards of the fuel tank. Therefore, the bottom end portion of the cooling device and a member such as a pipe coupled to the bottom end portion are supposed to be exposed downwards. In view of this, the cover is mounted for covering them from below and the lower part of the cooling device is thereby protected.

A wheel loader according to an eighth aspect of the present invention relates the wheel loader of any of the first to seventh aspects, and wherein the vehicle body frame includes an end plate and a reinforcing plate. The end plate is disposed on a rear end of the vehicle body frame while being extended in an up-and-down direction. The reinforcing plate is forwardly extended from the end plate while being integrally formed with the end plate.

In a conventional vehicle body frame, right and left frames are coupled at rear ends thereof through an end plate. The end plate is a single plate-shaped member that has a predetermined width in the up-and-down direction and has a thin thickness in the back-and-forth direction. By contrast, in the wheel loader of the eighth aspect, the reinforcing plate is provided integrally with the end plate while being forwardly extended from the end plate.

Here, in a side view, the cross-section of the rear end portion of the vehicle body frame is formed in an L-shape by the end plate and the reinforcing plate. Therefore, strength is enhanced for the rear end portion of the vehicle body frame. Accordingly, even when the rear end portion of the vehicle body frame is further expanded right and left compared to a conventional shape, strength thereof can be maintained, and it is possible to further increase the right-and-left directional width of the cooling device to be disposed inside the vehicle body frame. The capacity of the cooling device can be thereby further increased.

A wheel loader according to a ninth aspect of the present invention relates to the wheel loader of the eighth aspect, and further includes a bracket for allowing a rear part of the fuel tank to be supported by the reinforcing plate.

The bottom end portion of the cooling device is disposed rearwards of the fuel tank of the present invention. Therefore, the rear end of the fuel tank is shifted further forwards compared to a conventional rear part structure. On the other hand, the forwardly extended reinforcing plate is integrally mounted to the end plate. Therefore, the rear end portion of the fuel tank is supported by the forwardly extended reinforcing plate through the bracket.

A wheel loader according to a tenth aspect of the present invention relates to the wheel loader of any of the first to ninth aspects, and further includes a pipe making the coolant flow therethrough and is disposed in the clearance between the fuel tank and the cooling device. Further, the pipe is coupled to the bottom end portion of the cooling device at a position that the pipe is faced downwards through the clearance.

Here, the pipe is coupled to the cooling device, while being disposed in the position that the pipe is faced downwards through the clearance between the fuel tank and the cooling device. Therefore, in clamping the pipe with respect to the cooling device or in refastening the clamped part, a work can be executed through the clearance from below the vehicle. In other words, a maintenance work of the pipe can be easily performed.

According to the present invention as described above, the cooling device is disposed rearwards of the fuel tank and is extended while the bottom surface thereof is positioned lower than the top surface of the fuel tank. Therefore, the upper part of the cooling device is not required to be upwardly extended for increasing the cooling capacity, and accordingly, the cooling capacity can be increased without deteriorating a rear view. Further, a clearance is reliably produced between the fuel tank and the bottom end portion of the cooling device, and external air is configured to be inhaled through the clearance. Therefore, it is possible to hit cooling wind against the bottom end portion of the cooling device and deterioration in cooling performance is thereby prevented.

DESCRIPTION OF THE EMBODIMENTS

Figure 1:
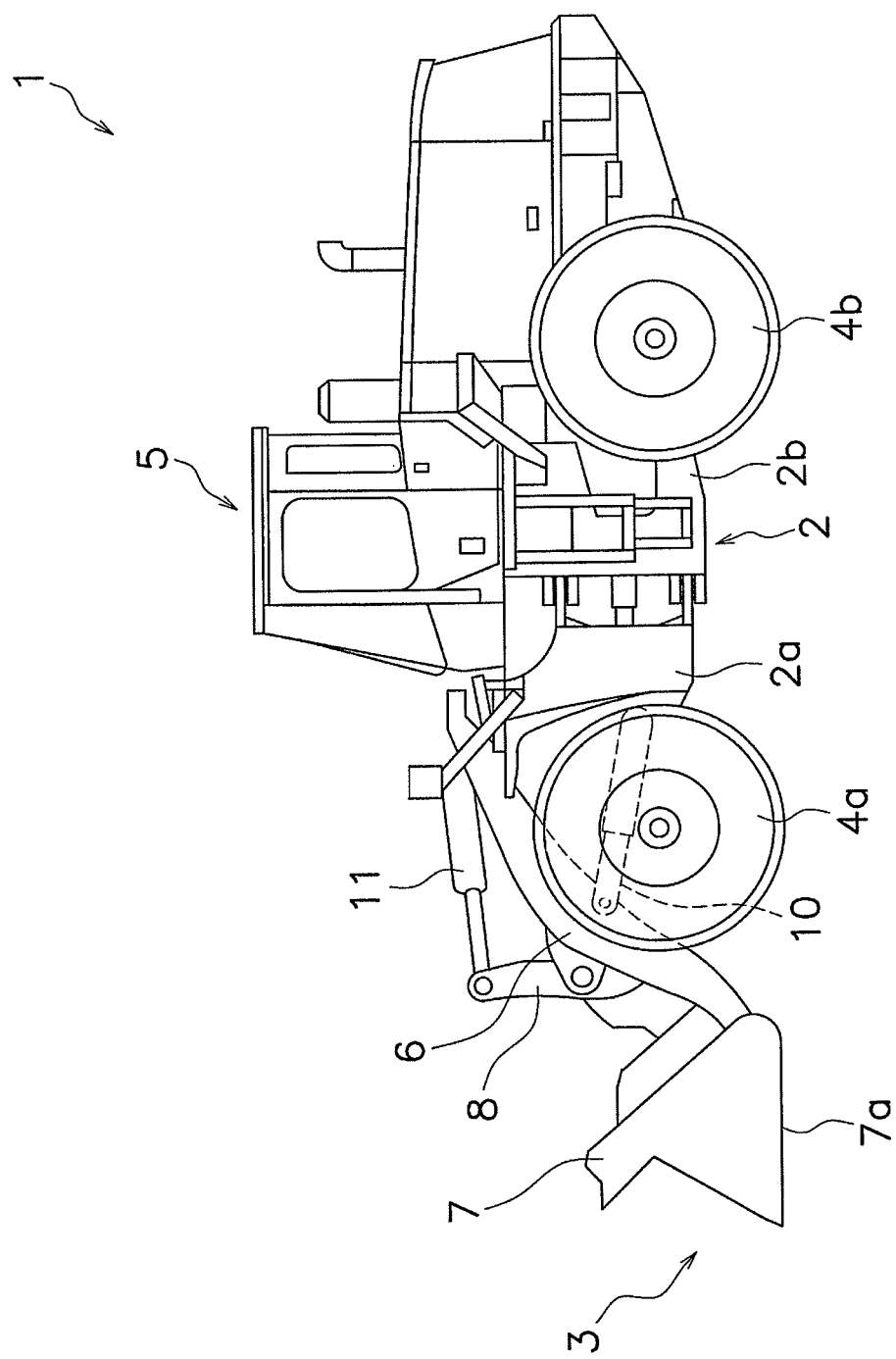
FIG. 1 is a side view of a wheel loader according to an exemplary embodiment of the present invention.
Figure 2:
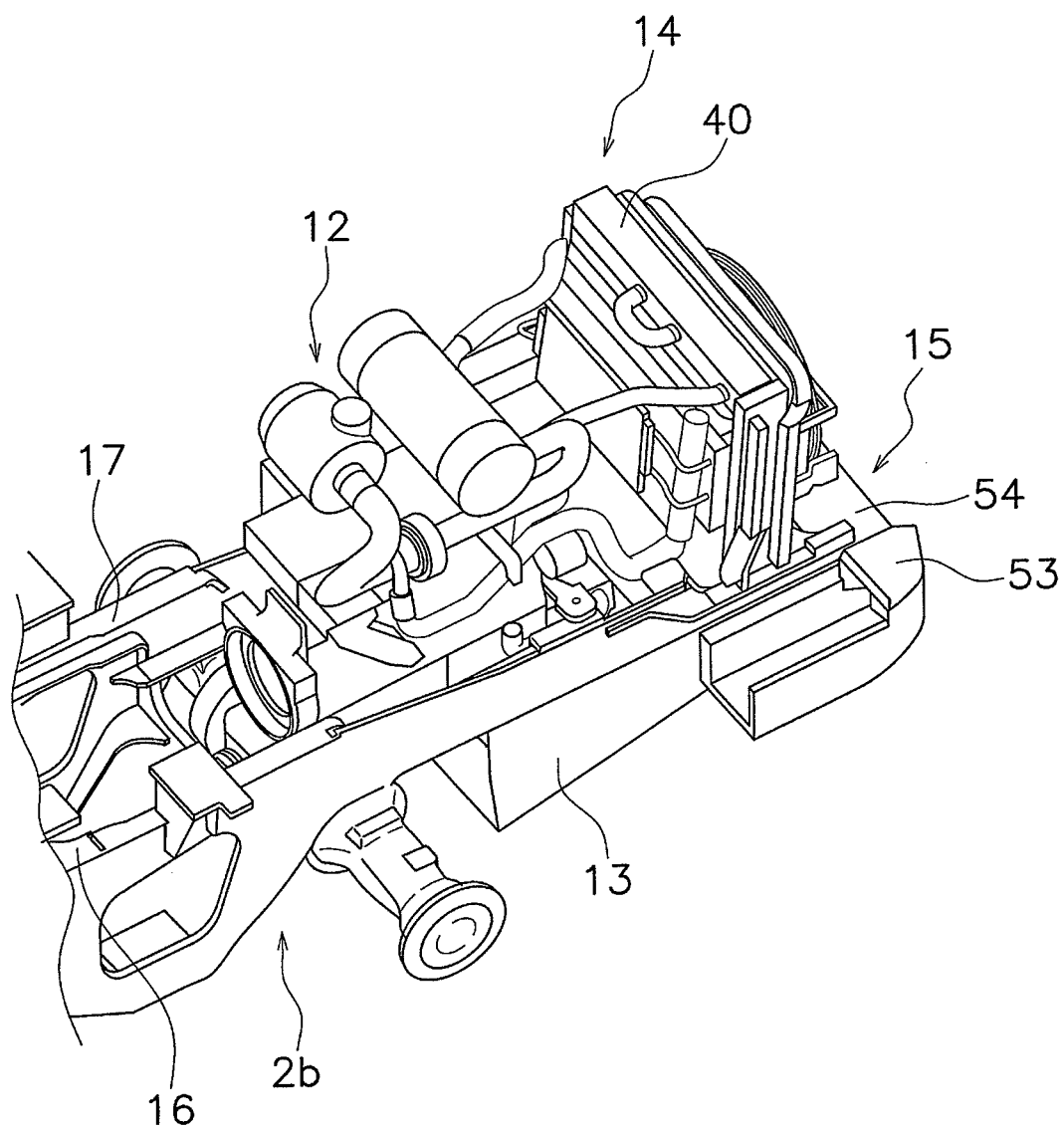
FIG. 2 is a perspective view of a rear part structure of the wheel loader.
Figure 3:
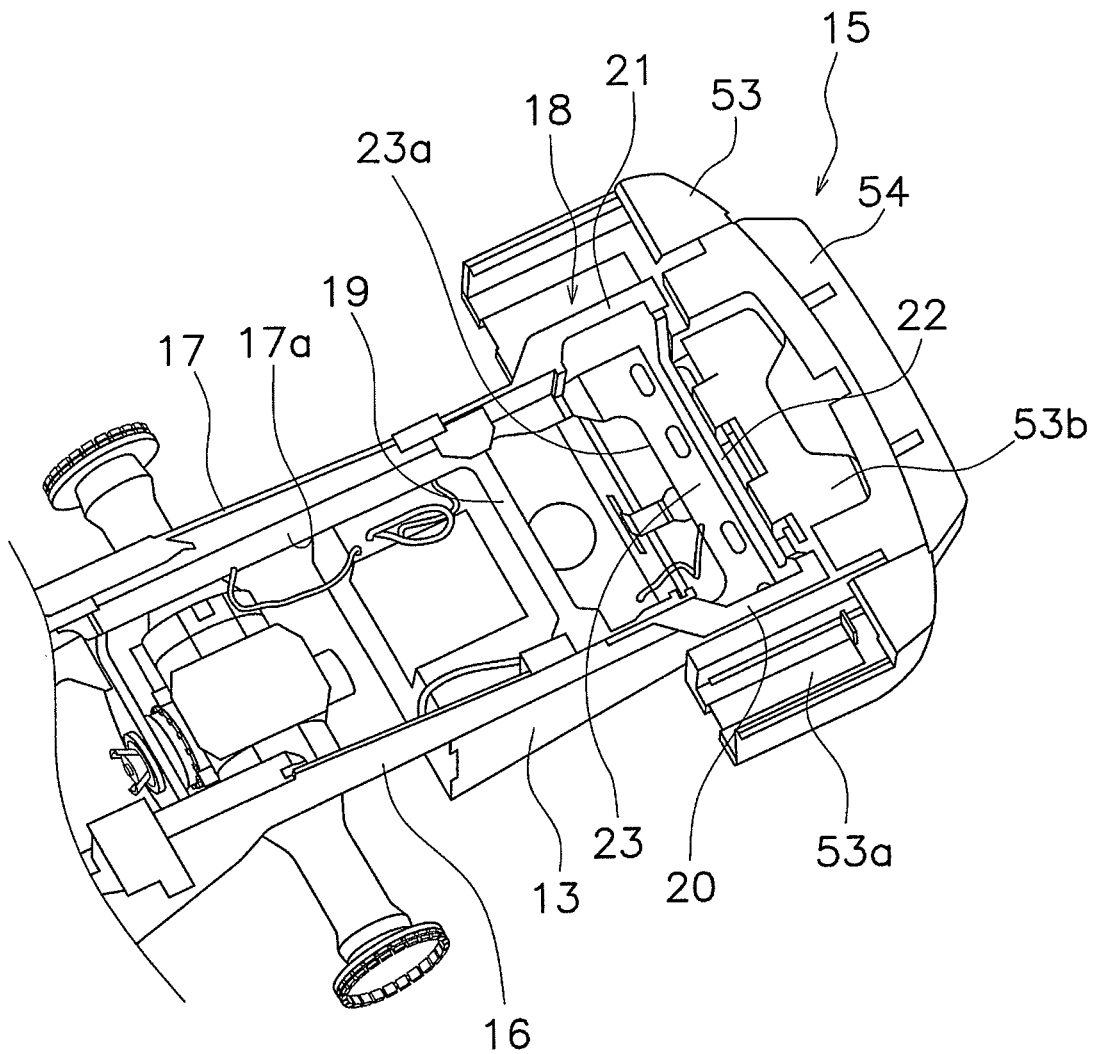
FIG. 3 is a perspective view of a vehicle body frame of the rear part structure.

FIG. 1 illustrates an external side view of a wheel loader according to an exemplary embodiment of the present invention, whereas FIGS. 2 and 3 illustrate a structure of the rear part of the wheel loader.

Overall Structure

A wheel loader 1 includes a vehicle body frame 2, a working unit 3, front wheels 4a, rear wheels 4b and a cab 5. The wheel loader 1 can be self-propelled by rotational driving of the front wheels 4a and the rear wheels 4b, and can execute a desired work using the working unit 3.

The vehicle body frame 2 includes a front vehicle body part 2a and a rear vehicle body part 2b. The front vehicle body part 2a and the rear vehicle body part 2b are coupled while being pivotable in the right-and-left direction. The front vehicle body part 2a is provided with the working unit 3 and the front wheels 4a. The rear vehicle body part 2b is provided with the cab 5 and the rear wheels 4b. The working unit 3 is disposed forwards of the front vehicle body part 2a and includes a boom 6, a bucket 7, a bell crank 8 and etc. The boom 6 is pivoted up and down by a pair of lift cylinders 10. Further, the bucket 7 is attached to the tip of the boom 6 and is pivoted up and down by a bucket cylinder 11 through the bell crank 8.

Overall Rear Part Structure

As illustrated in FIG. 2, an engine 12 is installed in the rear part of the rear vehicle body part 2b, and a fuel tank 13 is disposed below the engine 12. Further, a cooling device 14 is disposed rearwards of the engine 12. Yet further, a counterweight 15 is fixed to the rear end of the rear vehicle body part 2b.

Rear Vehicle Body Part 2b

As is obvious from FIG. 3, the rear vehicle body part 2b of the vehicle body frame 2 includes right and left transverse frames 17 and 16, a rear part frame 18 and a coupling frame 19 coupling the right and left transverse frames 17 and 16. It should be noted that FIG. 3 is illustrated where the engine 12 and the cooling device 14 are removed from FIG. 3.

Each of the right and left transverse frames 17 and 16 is formed in an L-shape in a front view, and the both ends of the coupling frame 19 are fixed to a horizontal portion 17a and a horizontal portion of the left transverse frame 16 (not illustrated in FIG. 3).

Figure 4:
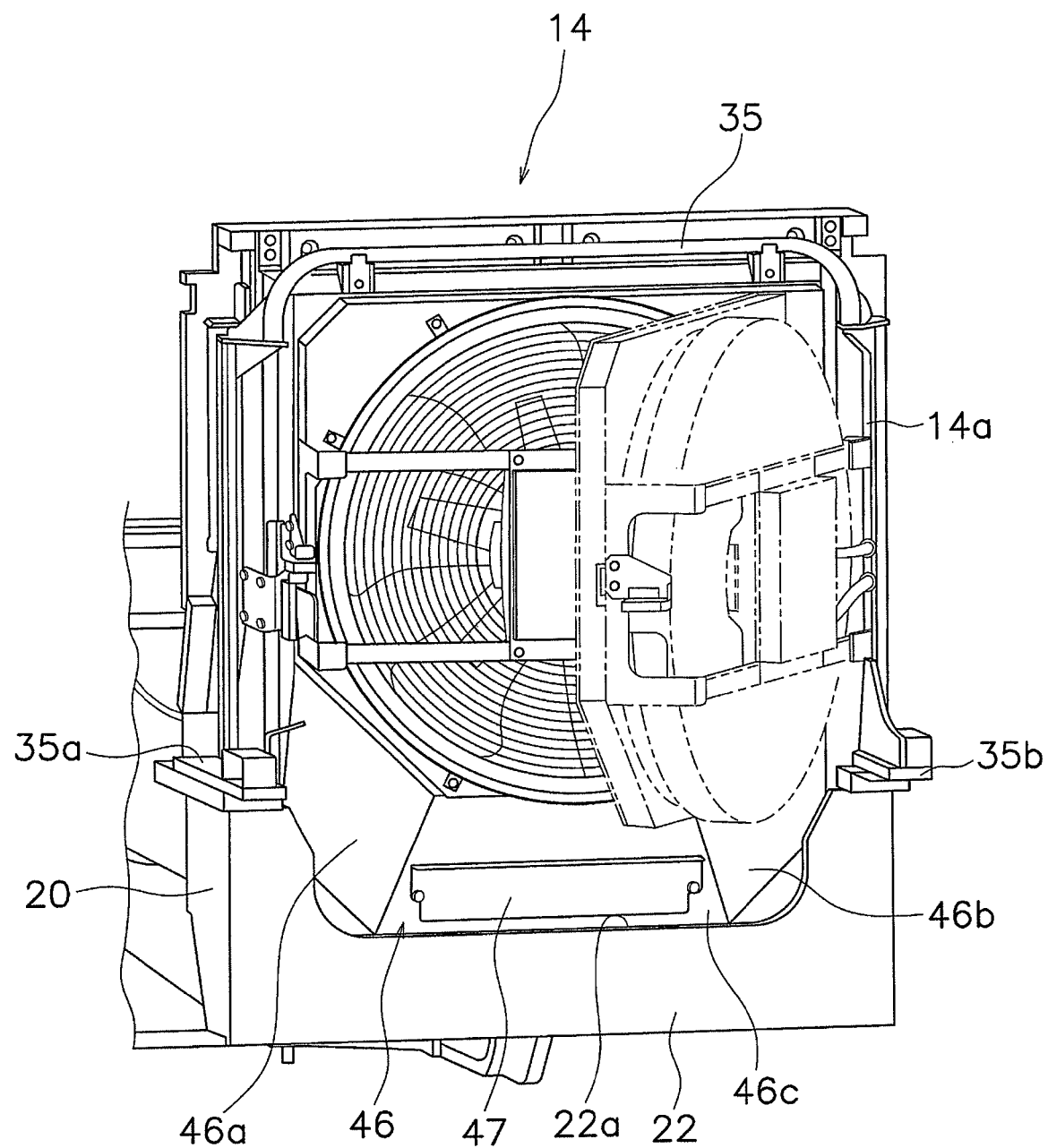
FIG. 4 is a diagram of a cooling device and a rear part frame seen from a rear side.

The rear part frame 18 includes right and left plates 21 and 20, an end plate 22 and a reinforcing plate 23. The right and left plates 21 and 20 are disposed further outside the right and left transverse frames 17 and 16, and thereby, the transverse inner space therebetween is larger than that on the front side. The end plate 22 is located on the rear end of the rear vehicle body part 2b while being extended in the up-and-down direction. Further, as illustrated in FIG. 4, a downwardly dented cut-out portion 22a is formed on a part of the end plate 22 except for the right and left end portions. It should be noted that FIG. 4 is diagram of the rear part structure seen from a rear side. The reinforcing plate 23 is disposed while being forwardly extended from the bottom end of the end plate 22. Further, the both end portions of the reinforcing plate 23 are further forwardly extended obliquely upwards than the other portions, while being fixed to the horizontal portions of the right and left transverse frames 17 and 16.

With the structure of the rear part frame 18 as described above, a portion in which the rear part frame 18 is disposed has a larger right-and-left transverse space and a deeper bottom, compared to those of the other portions of the rear vehicle body part 2b. Further, a portion of the reinforcing plate 23, except for the both end portions, is formed as a backwardly dented cut-out portion 23a.

Fuel Tank 13

Figure 5:
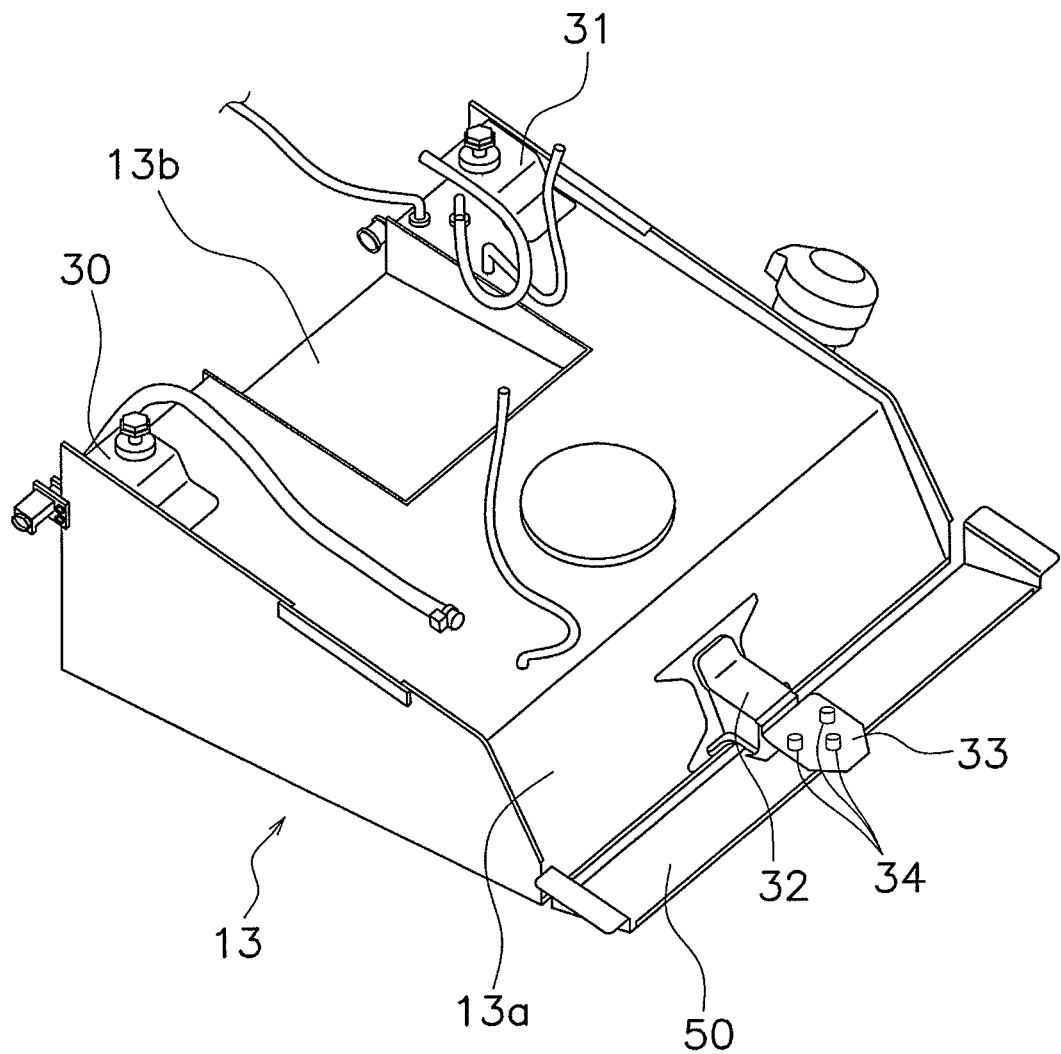
FIG. 5 is a perspective view of the fuel tank.

As illustrated in FIG. 3, the fuel tank 13 is fixed to the bottom surface of the rear vehicle body part 2b. In more detail, as illustrated in FIG. 5, right and left brackets 31 and 30 are disposed on the both of the right and left ends of the front end portion of the upper part of the fuel tank 13, whereas a rear bracket 33 is disposed on the center of the rear end portion through a support block 32 while being backwardly protruded therefrom. Further, the right and left brackets 31 and 30 are fixed to the horizontal portions of the right and left transverse frames 17 and 16 by means of bolts. On the other hand, the rear bracket 33 is fixed to the center part of the bottom surface of the reinforcing plate 23 by means of bolts 34.

The fuel tank 13 is a box-shaped container, and the top surface thereof is horizontally formed along the bottom surface of the rear vehicle body part 2b while the bottom surface thereof is formed for slanting obliquely upwards from front to rear. Further, a rear end surface 13a is formed as a slope slanting obliquely rearwards from up to down. Moreover, the fuel tank 13 has a recessed portion 13b on the front part of the top surface thereof for avoiding contact with the oil pan of the engine 12.

Cooling Device 14

As is obvious from FIG. 4, the cooling device 14 is supported by a squared-U frame 35. Right and left bottom end portions 35b and 35a of the squared-U frame 35 are fixed to the right and left plates 21 and 20 of the rear part frame 18.

Figure 6:
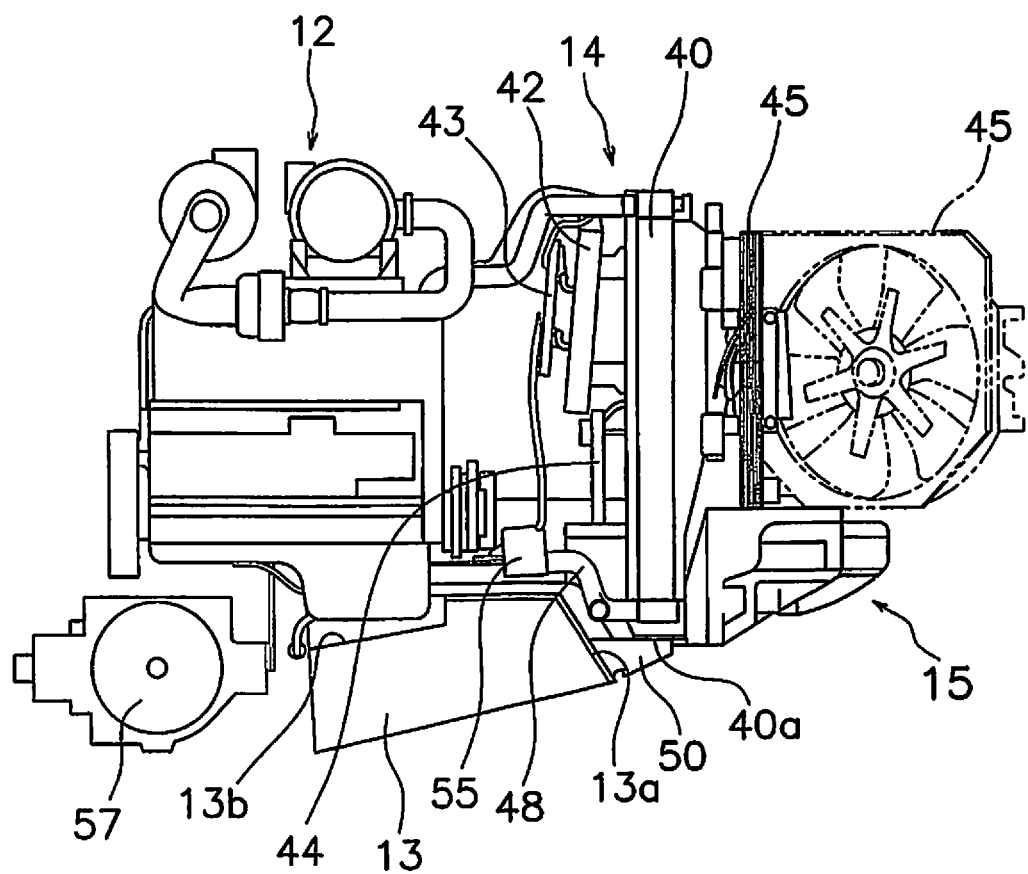
FIG. 6 is a side view of the rear part structure.

As illustrated in FIGS. 2, 6 (FIG. 6 omits illustration of the vehicle body frame) and 7, the cooling device 14 includes a radiator 40, an after cooler 42 disposed on the front face side of the radiator 40, a condenser 43 of an air conditioner disposed forwards of the after cooler 42, and an oil cooler 44 disposed below the after cooler 42. Further, the cooling device 14 includes a fan 45 disposed on the rear face side of the radiator 40, and a shroud 46 disposed between the fan 45 and the radiator 40. It should be noted that the cooling device 14 is disposed while the bottom end portion thereof is positioned lower than the top surface of the counterweight 15.

Further in the cooling device 14, a cooler 55 for a torque converter is disposed forwards of the lower part of the radiator 40, while being attached to the coupling frame 19 (see FIG. 3) by means of bolts. Also, a clearance is produced between the bottom plate of the cooler 55 for the torque converter and the top surface of the fuel tank 13.

As illustrated in FIG. 4, the fan 45 can be opened and closed in the transverse direction while being coupled at one lateral portion thereof to a frame body 14a of the cooling device 14 by means of a hinge. Further, the fan 45 is disposed in an off-set manner while the center thereof is positioned higher than that of the cooling device 14. It should be noted that the fan 45 is disposed while the bottom surface thereof is positioned higher than the top surface of the counterweight 15. Therefore, the fan 45 can be opened and closed without making contact with the counterweight 15.

The shroud 46 has a left lateral portion 46a, a right lateral portion 46b and a bottom portion 46c. The right and left lateral portions 46b and 46a serve to direct cooling wind to the fan 45 after the cooling wind passes through the right and left lateral portions of the lower part of the radiator 40, whereas the bottom portion 46c serves to direct cooling wind to the fan 45 after the cooling wind passes through the center portion of the bottom part of the radiator 40. It should be noted that a cover 47 for cleaning is detachably attached to the bottom portion 46c for cleaning earth, sand, dust and etc. accumulated inside the shroud 46.

Relation Between Fuel Tank 13 and Radiator 40

As described above, the radiator 40 is supported by the rear portion of the rear vehicle body part 2b through the squared-U frame 35. As illustrated in FIG. 6, the radiator 40 is disposed while the bottom end portion thereof is positioned rearwards of the fuel tank 13. Further, a predetermined interval is produced between the bottom end portion of the radiator 40 and the rear end surface 13a of the fuel tank 13. Further, the radiator 40 is disposed while a bottom surface 40a thereof is positioned lower than the top surface of the rear end portion of the fuel tank 13. In other words, the radiator 40 is disposed rearwards of the fuel tank 13 while being extended further downwards of the top surface of the fuel tank 13.

Figure 7:
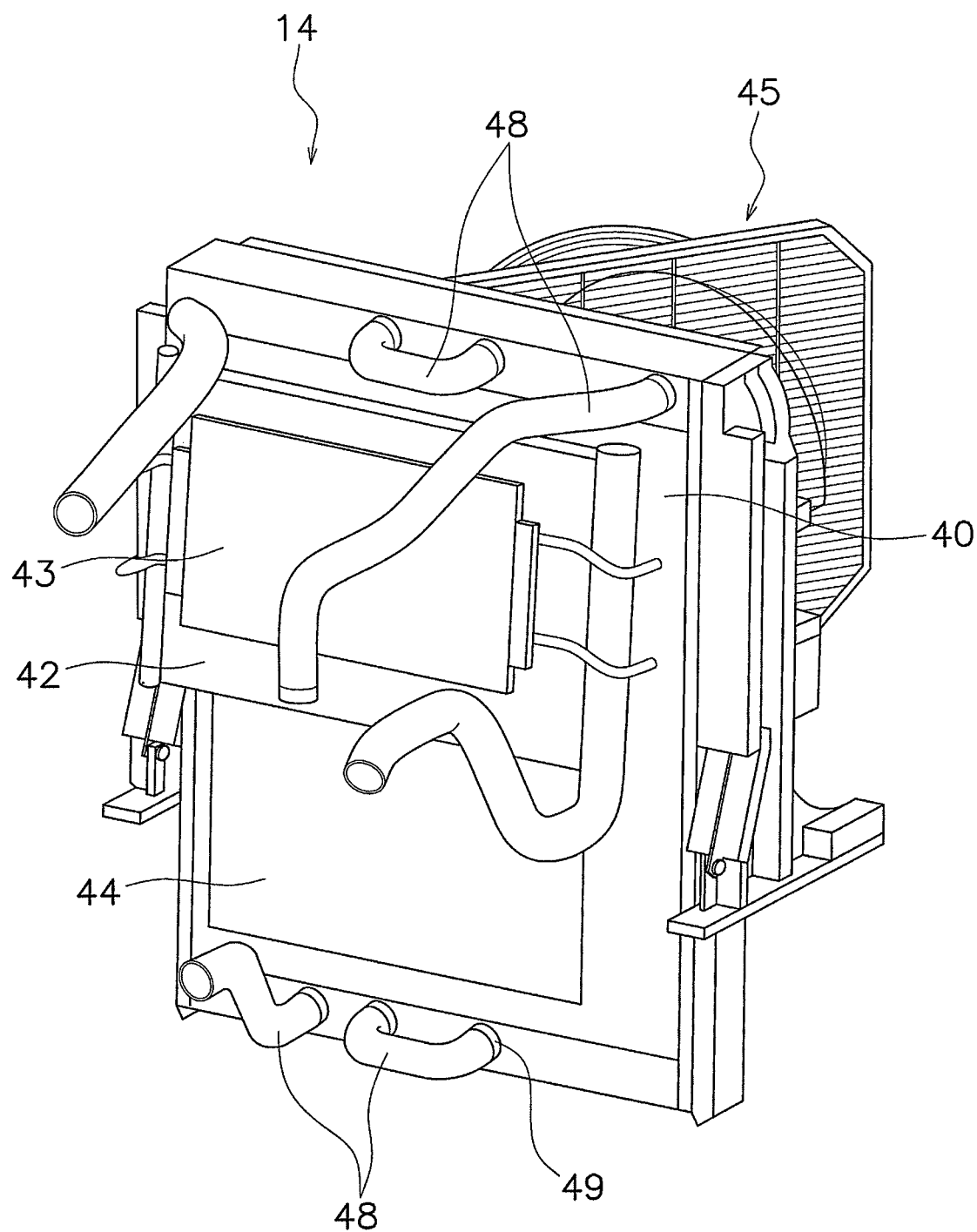
FIG. 7 is a diagram of the cooling device seen from a front side.
Figure 8:
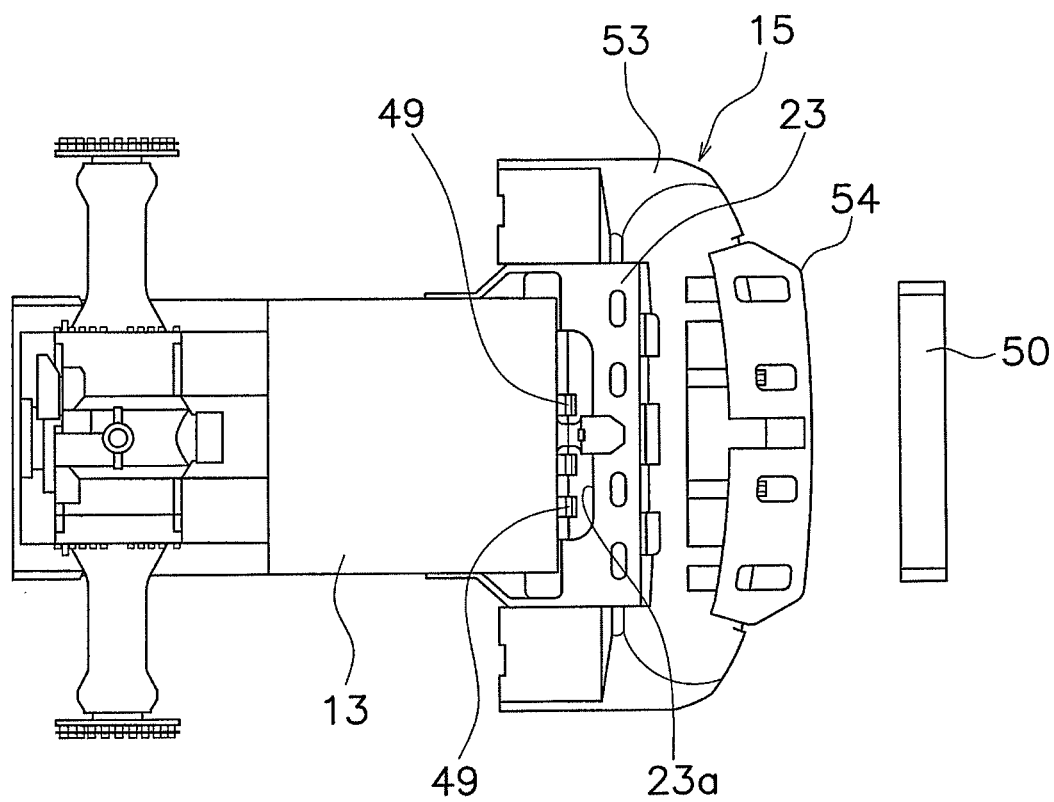
FIG. 8 is a bottom view of the rear part structure.

As illustrated in FIGS. 6 and 7, a plurality of pipes 48 are coupled to the radiator 40. Amongst the plural pipes 48, the ones disposed in a lower position are disposed in a space produced between the rear end surface 13a of the fuel tank 13 and the radiator 40. It should be noted that the respective pipes 48 are clamped by clamper members 49 on the engine side of the radiator 40. Further, as illustrated in FIG. 8 that is a bottom view of the rear part structure, the clamper part is faced downwards through the cut-out portion 23a of the reinforcing plate 23 while being disposed in the clearance between the fuel tank 13 and the radiator 40. Therefore, an operator is accessible to the clamper part from below Cover 50

As illustrated in FIGS. 5 and 6, a cover 50 is provided for covering from below the coupling part between the fuel tank 13 and the reinforcing plate 23 and the space between the fuel tank 13 and the radiator 40. The cover 50 is herein attached thereto while a clearance is produced between the cover 50 and the fuel tank 13. Therefore, it is possible to direct the cooling wind to flow into the space between the fuel tank 13 and the radiator 40 through the clearance.

Further, cooling wind is directed to flow into the lower part of the radiator 40 from a rear axle 57 side through the recessed portion 13b and the top surface of the fuel tank 13.

It should be noted that the cover 50 is removed in the illustration of FIG. 8. The both right and left end portions of the cover 50 are fixed to those of the reinforcing plate 23 by means of bolts.

Counterweight 15

As illustrated in FIGS. 2, 3 and 8, the counterweight 15 includes a main weight 53 and an additional weight 54. The main weight 53 is disposed on the rear, right and left sides of the rear part frame 18, whereas the additional weight 54 is disposed on the rear end of the main weight 53. The weights 53 and 54 are fastened together to the end plate 22 of the rear part frame 18 by means of a plurality of bolts.

Further, downwardly dented accommodation portions 53a (see FIG. 3) are respectively formed on the right and left parts of the main weight 53. The accommodation portions 53a are designed to accommodate devices such as a battery.

Yet further, a recessed portion 53b, opened forwards and closed rearwards, is formed in the right-and-left directional center part of the main weight 53. The right-and-left directional width of the recessed portion 53b is roughly the same as that of the cut-out portion 22a formed in the end plate 22. Further, the depth of the recessed portion 53b is roughly the same as that of the cut-out portion 22a of the end plate 22. In other words, the bottom surface of the recessed portion 53b is positioned at roughly the same height as the top surface of the cut-out portion 22a of the end plate 22. With such structure, an installation space is reliably produced for the shroud 46. Further, the cover 47 for cleaning, attached to the shroud 46, can be thereby easily accessed.

Cooling Operation

Although not illustrated in the figures, the vehicle body cover has intake ports on the upper part and the right and left lateral parts for inhaling cooling wind. Further, when the fan 45 is rotated, the cooling wind is introduced into the engine compartment through the intake ports. Simultaneously, the cooling wind is also introduced into the engine compartment from below the vehicle through the clearance between the rear end surface 13a of the fuel tank 13 and the cooling device 14.

Thus inhaled cooling wind passes through the after cooler 42, the condenser 43 of the air conditioner and the oil cooler 44 in the cooling device 14, further passes through the radiator 40, and is discharged rearwards through the fan 45. At this time, a part of the cooling wind, having passed through the lower part of the radiator 40, is upwardly introduced to the fan 45 along the shroud 46.

Maintenance

A member may be dropped between the fuel tank 13 and the radiator 40 during execution of an assembling work or a maintenance work. In such case, the dropped member can be taken out by detachment of the cover 50.

Incidentally, when cooling water is leaked out of the pipes 48 coupled to the lower part of the radiator 40, a work is executed while the cover 50 is detached. In other words, by the detachment of the cover 50, an operator is allowed to refasten the clamper members 49 from below or replace the pipes 48.

Further, in executing the maintenance of the fan 45, the fan 45 is transversely opened and the maintenance work is executed. When earth, sand, dust and etc. are accumulated on the lower part of the shroud 46, such earth, sand and etc. may be removed while the cover 47 for cleaning is detached.

(1) The radiator 40 is disposed rearwards of the fuel tank 13, while being extended downwards of the top surface of the fuel tank 13. Therefore, the capacity of the radiator 40 can be increased without being extended upwards. Therefore, the cooling capacity can be enhanced without deteriorating a rear view.

(2) A clearance is produced between the fuel tank 13 and the cooling device 14. Therefore, cooling wind is introduced from below through the clearance, and accordingly, the cooling wind can be also fed to the bottom end portion of the cooling device 14 overlapped with the fuel tank 13.

(3) The rear end surface 13a of the fuel tank 13, opposed to the cooling device 14, is slanted obliquely rearwards from up to down. Therefore, external air is easily directed to the clearance between the fuel tank 13 and the bottom end portion of the cooling device 14.

(4) The cooling device 14, including the radiator and etc., is not disposed over the fuel tank 13. Therefore, it is easy to clean earth, sand and dust accumulated on the top surface of the fuel tank 13.

(5) A space is produced between the rear end surface 13a of the fuel tank 13 and the cooling device 14. Pipes to be attached to the cooling device 14 can be disposed with use of the space. Therefore, the pipes can be easily handled. Further, even if a member is dropped between the fuel tank 13 and the cooling device 14 during execution of an assembling work or a maintenance work, the dropped member can be easily taken out by detachment of the cover 50.

(6) With the reinforcing plate 23 herein provided, the right-and-left directional width of the rear part frame 18 can be increased without deteriorating the strength of the rear part frame 18. It is thereby possible to further increase the capacity of the radiator 40 to be disposed inside the rear part frame 18.

Further, the rear end portion of the fuel tank 13 is supported using the reinforcing plate 23. Therefore, the fuel tank 13 can be easily supported.

(7) The clamper part, clamping the pipes with respect to the cooling device 14, is faced downwards through the space between the fuel tank 13 and the cooling device 14. Therefore, an operator is allowed to easily access the clamper part from below the vehicle in executing a piping work, and thereby, such work will be easily done.

(8) The recessed portion 53a is formed in the main weight 53, and further, the cut-out portion 22a is formed in the end plate 22. Therefore, an installation space can be reliably produced for the shroud 46. Further, the cover 47 for cleaning, mounted to the shroud 46, can be easily accessed.

Other Exemplary Embodiments

The present invention is not limited to the aforementioned exemplary embodiment, and a variety of changes or modifications can be herein made without departing from the scope of the present invention.

In the aforementioned exemplary embodiment, the present invention has been applied to the relation between the radiator and the fuel tank. However, the present invention can be similarly applied to a relation between the fuel tank and any other cooling device except for the radiator.

In the wheel loader according to the illustrated embodiment, the cooling device is disposed rearwards of the fuel tank and is extended while the bottom surface thereof is positioned lower than the top surface of the fuel tank. Therefore, the upper part of the cooling device is not required to be upwardly extended for increasing the cooling capacity, and accordingly, the cooling capacity can be increased without deteriorating a rear view. Further, in the wheel loader according to the illustrated embodiment, a clearance is reliably produced between the fuel tank and the bottom end portion of the cooling device, and external air is configured to be inhaled through the clearance. Therefore, it is possible to hit cooling wind against the bottom end portion of the cooling device, and deterioration in cooling performance is thereby prevented.

The invention claimed is:

1. A wheel loader comprising:
a vehicle body frame;
an engine installed in the vehicle body frame;
a working unit including a boom and a bucket mounted to a front end of the boom, the working unit being disposed forwards of the vehicle body frame;
a fuel tank attached to a bottom surface of a rear part of the vehicle body frame, the fuel tank having a rear end surface slanted obliquely rearwards from up to down; and
a cooling device configured to release heat of a coolant flowing through an inside thereof, the cooling device being supported by the rear part of the vehicle body frame, a bottom end portion of the cooling device being opposed to and separated away from a rear end surface of the fuel tank at a predetermined distance in a frontwards-to-rearwards direction, a bottom surface of the cooling device being positioned lower than a top surface of a rear end portion of the fuel tank.

2. The wheel loader recited in claim 1, further comprising a counterweight disposed rearwards of the cooling device, wherein the bottom end portion of the cooling device is positioned lower than a top surface of the counterweight.

3. The wheel loader recited in claim 2, wherein the cooling device includes:
a radiator; and
a fan disposed rearwards of the radiator, the fan being configured to feed a cooling wind from front to rear of the radiator.

4. The wheel loader recited in claim 3, wherein a center of the fan is upwardly off-set with respect to a center of the cooling device.

5. The wheel loader recited in claim 3, wherein the fan is disposed with a bottom surface thereof being positioned higher than the top surface of the counterweight, the fan being allowed to be opened and closed about one of lateral parts thereof in a transverse direction.

6. The wheel loader recited in claim 3, wherein the cooling device further includes a shroud disposed below the fan, the shroud directing the cooling wind having passed through the radiator to the fan.

7. The wheel loader recited in claim 1, further comprising a cover covering a clearance between the fuel tank and the cooling device from below.

8. The wheel loader recited in claim 1, wherein the vehicle body frame includes:
an end plate disposed on a rear end of the vehicle body frame and extending in an up-and-down direction; and
a reinforcing plate forwardly extending from the end plate, the reinforcing plate integrally formed with the end plate.

9. The wheel loader recited in claim 8, further comprising a bracket for supporting a rear part of the fuel tank by the reinforcing plate.

10. The wheel loader recited in claim 1, further comprising a pipe disposed in a clearance between the fuel tank and the cooling device with the coolant flowing therethrough, wherein the pipe is coupled to the bottom end portion of the cooling device at a position that the pipe faces downwards through the clearance.

* * * * *